United States Patent
Osagawa et al.

(10) Patent No.: US 9,008,889 B2
(45) Date of Patent: Apr. 14, 2015

(54) METHOD OF CONTROLLING TRAVEL WITHIN TRAVEL SYSTEM FOR UNMANNED VEHICLE AND TRAVEL SYSTEM FOR UNMANNED VEHICLE

(75) Inventors: Kenta Osagawa, Fujisawa (JP); Tomonori Ozaki, Kanagawa (JP); Koji Takeda, Tama (JP); Takashi Hiranaka, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/634,260

(22) PCT Filed: Nov. 29, 2011

(86) PCT No.: PCT/JP2011/077522
§ 371 (c)(1),
(2), (4) Date: Oct. 23, 2012

(87) PCT Pub. No.: WO2012/073950
PCT Pub. Date: Jun. 7, 2012

(65) Prior Publication Data
US 2013/0238182 A1    Sep. 12, 2013

(30) Foreign Application Priority Data
Nov. 30, 2010    (JP) .................................. 2010-266889

(51) Int. Cl.
G01C 22/00    (2006.01)
G05D 1/02    (2006.01)
E21C 47/00    (2006.01)

(52) U.S. Cl.
CPC .............. *G05D 1/021* (2013.01); *G05D 1/0274* (2013.01); *G05D 2201/0202* (2013.01); *E21C 47/00* (2013.01); *G05D 1/0223* (2013.01); *G05D 1/0278* (2013.01)

(58) Field of Classification Search
CPC ..... G05D 1/0278; G05D 1/027; G05D 1/021; G05D 1/0223; G05D 1/0272
USPC .................... 701/23–26, 41, 30.5, 30.7, 31.2; 318/587; 348/118, 119
See application file for complete search history.

(56) References Cited

U.S. PATENT DOCUMENTS

| 4,809,178 A * | 2/1989 | Ninomiya et al. .............. 701/23 |
| 6,539,294 B1 * | 3/2003 | Kageyama ....................... 701/23 |
| 8,239,084 B2 * | 8/2012 | Yamamoto et al. ............. 701/26 |
| 8,386,110 B2 * | 2/2013 | Maekawa et al. ............... 701/23 |
| 2008/0125958 A1 * | 5/2008 | Boss et al. ..................... 701/123 |

FOREIGN PATENT DOCUMENTS

| JP | 02-252825 A | 10/1990 |
| JP | 07-64634 A | 3/1995 |

(Continued)

OTHER PUBLICATIONS

International Search Report of the International Searching Authority mailed Feb. 14, 2012 for the corresponding international application No. PCT/JP2011/077522 (with English translation).

*Primary Examiner* — Helal A Algahaim
*Assistant Examiner* — Shardul Patel
(74) *Attorney, Agent, or Firm* — Posz Law Group, PLC

(57) ABSTRACT

Topographical data for a work location is created and information on a new travel route is generated. Next, a work location including the new travel route is constructed on the basis of the created topographical data. Then, the information on the new travel route generated is provided to the vehicle, the vehicle is made to travel along said new travel route in accordance with temporary travel control data, and actual topographical data for the new travel route is acquired. Next, the aforementioned temporary travel control data is corrected on the basis of the acquired actual topographical data for the new travel route. After that, the unmanned vehicle is made to travel in accordance with the corrected travel control data.

20 Claims, 6 Drawing Sheets

(56) References Cited

FOREIGN PATENT DOCUMENTS

| JP | H0764634 A | * | 3/1995 |
| JP | 09-212238 A | | 8/1997 |
| JP | 2001-344017 A | | 12/2001 |
| JP | 2005-98853 A | | 4/2005 |
| JP | 2005-157689 A | | 6/2005 |

* cited by examiner

METHOD OF CONTROLLING TRAVEL WITHIN TRAVEL SYSTEM FOR UNMANNED VEHICLE AND TRAVEL SYSTEM FOR UNMANNED VEHICLE

CROSS REFERENCE TO RELATED APPLICATIONS

This application is a U.S. national stage application of PCT/JP2011/077522 filed on Nov. 29, 2011, and claims priority to, and incorporates by reference, Japanese Patent Application No. 2010-266889 filed on Nov. 30, 2010.

TECHNICAL FIELD

The present invention relates to a method of controlling travel within a travel system for an unmanned vehicle and a travel system for an unmanned vehicle, for making an unmanned vehicle travel along a travel route within a work location.

BACKGROUND ART

In wide-area work locations such as quarries and mines, vehicles for carrying earth and sand are used. During performing the task of carrying earth and sand, in order to avoid accidents of operators for the vehicles (workers) due to their fatigue as well as in order to achieve manpower saving and improve productivity by elongating working hours, unmanned vehicular travel systems have been introduced in which unmanned dump trucks are put in operation in place of manned vehicles such as manned off-road dump trucks.

In a work location where unmanned dump trucks travel, there are areas such as a loading site, an earth unloading site and fuelling site. These areas are connected to each other through well-maintained conveying roads called haul road, lead-in roads called access road for leading to each of the areas from the haul roads, and crossover points.

The loading site, which is one of the areas, is a place where loading operations for loading earth and sand onto dump trucks (called "unmanned vehicle" in the present invention) are performed, and excavation operations by manned loaders such as wheel loaders (front-end loaders), backhoes and shovels (for example, hydraulic shovels) and loading operations for loading earth and sand onto the unmanned vehicles are performed.

To design a work location such as a mine with a technique of CAD (Computer Aided Design), and to construct the work location based on designed CAD data has already been a known art. Nowadays, work locations are constructed based on CAD data, that is, three dimensional topographical data.

Conventional Technique

To make unmanned vehicles travel in a work location, topographical data for the work location is required. Specifically, information on a travel route is determined based on the topographical data with a road shoulder position, gradient, etc. in the work location being as parameters, and travel control data such as maximum speed for unmanned vehicles is determined based on the topographical data (for example, steepness of gradient). With the information on a travel route and the travel control data being provided to an unmanned vehicle, the unmanned vehicle travels along the travel route in accordance with the travel control data, and performs a travel control such as acceleration and deceleration, stop and turning by utilizing various types of information acquired from a speed sensor and GPS (Global Positioning System) sensors, etc. mounted on own vehicle.

In the past, although there was a case in which CAD data was utilized for the construction of work locations, there was not a case in which CAD data served to generate information on a travel route or travel control data. In fact, in the past, an actual configuration of the earth's surface was measured after the construction of a work location, and information on a travel route and travel control data were generated based on the result of the measurement.

For example, the case is now supposed in which a new loading site is added in the work location, and a travel route is created that adopts a loading point existing within the new loading site as a target point for unmanned vehicles. Incidentally, the loading site is a place where loading operations for loading earth and sand onto dump trucks are performed. In the loading site, excavation operations by loaders such as wheel loaders, backhoes, shovels and excavators, and loading operations loading earth and sand onto unmanned vehicles are performed. In this case, the following processes are generally performed from the designing of the work location to the actual operations of unmanned vehicles.

1) Using the CAD system, CAD data to which the configuration of the earth's surface of a new loading site is added is generated by an operator of the CAD.
2) Based on the CAD data, a new loading site is constructed by construction machines such as bulldozers and motor graders.
3) When the new loading site has been constructed, a measuring-dedicated vehicle is made to travel to measure and acquire actual topographical data such as data on boundary of the loading site.
4) The measured and acquired actual topographical data is transmitted to a supervising device, at which, based on the actual topographical data, information on a new travel route which adopts the new loading site as a target point for unmanned vehicles and travel control data are generated.
5) The information on the new travel route and travel control data are transmitted to an unmanned vehicle through wireless communications, and the unmanned vehicle travels up to the new loading site along the new travel route while performing travel control such as acceleration and deceleration, stop and turning in accordance with the travel control data.

Conventional Art 1 Shown in Patent Documents

Patent document 1 describes the invention that, when an autonomous travel cleaning vehicle cleans the floors of a building, a travel path for cleaning is generated based on CAD data generated at the time when the building is designed.

Conventional Art 2 Shown in Patent Documents

Patent document 2 describes the invention in which a GPS sensor detects the position of an vehicle, the detected position data is collected to calculate running orbits along which the vehicle actually ran, the number of lanes and a width of the road on which the vehicle ran are estimated from the running orbits calculated, and an existing map data is updated by the estimated data.

Patent document 1: Official gazette of Japanese patent application laid-open no. H09-212238

Patent document 2: Official gazette of Japanese patent application laid-open no. 2005-98853

DISCLOSURE OF THE INVENTION

Problems to be Solved by the Invention

According to a conventional technique, after a work location has been constructed, in order for an unmanned vehicle to be able to operate (travel), it is required to perform a process of measuring in detail topographical data at the work location such as boundary of the loading site, and a process of generating a travel route from the detailed topographical data. To perform these processes, a great deal of man-hour is required until unmanned vehicles are made to travel. As a result, the productivity of the carrying operations by unmanned vehicles was impaired and the operation cost for the work location was greatly increased.

The present invention has been made in view of the foregoing circumstances, and an object of the invention is to improve the productivity of the carrying task by unmanned vehicles as well as to reduce the operation cost for the work location by making it unnecessary a process for measuring in detail topographical data at the work location and a process for generating a travel route based on the topographical data which are to be performed after the work location is constructed and until an unmanned vehicle is run, and by making it possible, after a work location is constructed, for an unmanned vehicle to be immediately able to operate (travel) along a travel route.

Measures to Solve the Problem

The first invention is that in a travel system for an unmanned vehicle that makes the unmanned vehicle travel along a travel route within a work location, a method of controlling travel within the travel system for an unmanned vehicle, comprising the steps of:
  generating information on a new travel route by creating topographical data for the work location;
  constructing a work location including the new travel route based on the created topographical data;
  acquiring actual topographical data for the new travel route by providing the information on the new travel route generated to a vehicle and making the vehicle travel along the new travel route in accordance with temporary travel control data;
  correcting the temporary travel control data based on the acquired actual topographical data for the new travel route; and
  making the unmanned vehicle travel in accordance with the corrected travel control data.

The second invention is characterized by, in the first invention, further comprising the step of correcting the topographical data for the work location based on the acquired actual topographical data for the new travel route.

The third invention is characterized in that, in the first or second invention, topographical data created before construction of the work location includes gradient data, and the temporary travel control data includes a temporary travel speed for the vehicle; and
  a speed limit by the temporary travel speed is relaxed in accordance with an increase in reliability of the gradient data among the topographical data created before the construction of the work location.

The forth invention is characterized in that, in the first through third inventions, topographical data created before the construction of the work location includes gradient data, and the temporary travel control data includes a temporary travel speed for the vehicle; and
  a speed limit by the temporary travel speed is relaxed in accordance with an increase in reliability of actual gradient data for the new travel route acquired after the construction of the work location.

The fifth invention is characterized in that, in the first through fourth inventions, topographical data created before the construction of the work location includes gradient data, and the temporary travel control data includes a temporary travel speed for the vehicle;
  reliability of the gradient data for the work location is judged by performing acquisition of actual topographical data a plurality of times; and
  speed limit by the temporary travel speed is relaxed in accordance with an increase in reliability of the gradient data for the work location.

The sixth invention is characterized in that, in the first through fifth inventions, both the vehicle for acquiring the actual topographical data for the new travel route and the unmanned vehicle that travels in accordance with the corrected travel control data are unmanned vehicles for carrying freight.

The seventh invention is a travel system for an unmanned vehicle that makes the unmanned vehicle travel along a travel route within a work location, characterized in that
  the travel system
  generates information on a new travel route by creating topographical data for the work location;
  constructs a work location including the new travel route based on the created topographical data;
  acquires actual topographical data for the new travel route by providing a vehicle with the information on the new travel route generated and making the vehicle travel along the new travel route in accordance with temporary travel control data;
  corrects the temporary travel control data based on the acquired actual topographical data for the new travel route; and
  makes the unmanned vehicle travel in accordance with the corrected travel control data.

Effect of the Invention

According to the first and the seventh inventions, information on a new travel route is generated before the stage in which a work location including a new travel route has not been constructed, and the information on the new travel route is given to an unmanned vehicle immediately after the work location including the new travel route has been constructed so that the unmanned vehicle can travel along the new travel route immediately. Hence, the productivity of the carrying task by unmanned vehicles can be improved and cost for the operations of the work location can be reduced.

Incidentally, "vehicle" that travels in accordance with temporary travel control data after the work location has been constructed may be either an unmanned vehicle or a manned vehicle, and may be or may not be a transporter vehicle for carrying freight.

In particular, in the case where an unmanned transporter vehicle for carrying freight is made to travel in accordance with temporary travel control data, it is possible to perform carrying operations at the same time when the operation for measuring actual topographical data for the new travel route is performed. As a result, compared with the case where a vehicle which is dedicated to measuring and performs no carrying operation is made to travel, a working efficiency and productivity of carrying task can be further improved (the sixth invention).

Since topographical data for the work location before its construction (design data by CAD, i.e., CAD data) is not reflected by an actual configuration of the earth's surface after the construction, reliability with respect to an accuracy of the configuration of the earth's surface is low. Therefore, instead of using as it is the low reliable travel control data generated in accordance with the topographical data of the work location, a vehicle is made to travel in accordance with a temporal travel control data. In the case where the topographical data for the work location is gradient data, and the temporary travel control data is a temporary travel speed, a speed limit by the temporary travel speed can be relaxed in accordance with the degree of the reliability of the gradient data. For example, if the reliability of the gradient data is higher among the topographical data created before the construction of the work location, the vehicle can be made to travel at a higher temporary travel speed (the third invention).

When the actual topographical data for the new travel route has been measured and acquired by making the vehicle travel, the temporary travel control data is corrected based on the acquired actual topographical data for the new travel route, and travel control data reflecting the actual configuration of the earth's surface is acquired.

In this case, if the actual topographical data is gradient data and the temporary travel control data is a temporary travel speed, the temporary travel speed (for example, a maximum speed at a low speed) is corrected into the travel control data corresponding to the actual gradient (for example, a maximum speed at a high speed corresponding to the actual gradient). In this regard, however, the speed limit by the temporary travel speed is relaxed in accordance with the reliability of the actual gradient data for the new travel route acquired after the construction of the work location (the fourth invention). In this case, reliability of the gradient data for the work location is judged by performing acquisition of actual topographical data a plurality of times, and the speed limit by the temporary travel speed can be relaxed in accordance with an increase in reliability of the gradient data for the work location (the fifth invention). For example, by making plural unmanned vehicles travel at a temporary travel speed successively one after another to accumulate gradient data accordingly, the variation among the gradient data becomes smaller as gradient data is accumulated. According to statistics, when the variation among the vehicles becomes smaller, it becomes possible to gradually change the speed limit by the temporary travel speed from a lower speed to a higher speed.

When the travel control data has been corrected so that the travel control data can reflect the actual configuration of the earth's surface of the new travel route, it is possible to make an unmanned vehicle travel in accordance with the corrected travel control data.

In this case, correction may be made not only for the temporary travel control data based on the acquired actual topographical data for the new travel route, but also for the topographical data (CAD data) for the work location based on the acquired actual topographical data for the new travel route (the second invention).

BEST MODE FOR CARRYING OUT THE INVENTION

Exemplary embodiments of a method of controlling travel within a travel system for an unmanned vehicle and a travel system for an unmanned vehicle according to the present invention will be described below with reference to the accompanying drawings. Incidentally, in the exemplary embodiments, it is assumed that unmanned vehicles are unmanned off-road dump trucks.

FIGS. 1A and 1B are top plan views of a work location 1 in which FIG. 1A illustrates the work location 1 to which a loading site 12 is yet to be added and FIG. 1B illustrates the work location 1 to which the loading site 12 has been added. The work location 1 includes such areas as a loading sites 11 and 12, an earth unloading site 13 and a fuelling site 14. These areas are connected to each other through haul roads 15 (15A, 15B, 15C), that is, conveying roads with well-maintained road surfaces and road shoulders, and a crossroad 16.

In this embodiment, by way of example, it is assumed that an unmanned vehicle 20 travels along travel routes 10 (10A, 10B) which extend from the earth unloading site 13 toward the loading sites 11 and 12. The earth unloading site 13 is a place onto which earth and sand loaded in a load-carrying platform of the unmanned vehicle 20 are to be unloaded.

Referring to FIG. 1A, the loading site 11 and the crossroad 16 are connected to each other by way of a haul road 15A, and the crossroad 16 and the earth unloading site 13 are connected to each other by way of a haul road 15B.

Referring to FIG. 1B, in addition, the loading site 12 and the crossroad 16 are connected to each other by way of a haul road 15C.

The loading sites 11 and 12, which are one of the areas, are places where a loading operation for loading earth and sand onto the unmanned vehicle 20 is performed, and an excavation operation by a loader 30 such as a wheel loader (a front-end loader), a backhoe, a shovel and an excavator, and as a loading operation for loading earth and sand onto the unmanned vehicle 20 are performed.

The earth unloading site 13, which is one of the areas, is a place where an operation for unloading or removing earth and sand, which is a freight of the unmanned vehicle 20, is performed, and ground improvement operations are performed by dozing the unloaded earth and sand with a dozing machine 90 such as a bulldozer and a wheel dozer.

Referring to FIG. 1A, the unmanned vehicle 20, having unloaded earth and sand at the earth unloading site 13, travels along a travel route 10A, enters the haul road 15B from an earth unloading point 13a of the earth unloading site 13 through an exit point 13b of the earth unloading site 13, arrives at an entry point 11a of the loading site 11 through the haul road 15B, the crossroad 16 and the haul road 15A, and travels through the entry point 11a and within the loading site 11 up to a loading point 11b at which the manned loader 30 is present. Thus, the loading point 11b serves as a target point for the unmanned vehicle 20 traveling on the travel route 10A. Incidentally, "entry point" and "exit point" are preset points, where the haul roads on which the unmanned vehicle 20 travels, the loading site and the earth unloading site intersect.

Referring to FIG. 1B, with the loading site 12 being added, the travel route 10B is created other than the travel route 10A. Specifically, as shown in FIG. 1B, the unmanned vehicle 20, having unloaded earth and sand at the earth unloading site 13, travels along a travel route 10B. The travel route 10B is a route along which the unmanned vehicle 20 enters the haul road 15B from an earth unloading point 13a of the earth unloading site 13 through an exit point 13b of the earth unloading site 13, arrives at an entry point 12a of the loading site 12 through the haul road 15B, the crossroad 16 and the haul road 15C, and travels through the entry point 12a and within the loading site 12 up to a loading point 12b at which the manned loader 30 is present. Thus, the loading point 12b is a target point for the unmanned vehicle 20 traveling along the travel route 10B.

FIG. 2 is a block diagram illustrating a configuration of an unmanned vehicle travel system 70 and a CAD system 80 provided outside of the unmanned vehicle travel system 70 according to an exemplary embodiment.

The CAD system 80, which is provided outside of the unmanned vehicle travel system 70, is a system for designing the work location 1 using the technique of CAD (Computer Aided design). The CAD system 80 stores topographical data for a mine as CAD data. The CAD system 80 is constituted by arithmetic units such as CPU (numeric data processor), storage units such as ROM, RAM and hard disk, input devices such as keyboard, pointing device and tablet, display devices such as a liquid crystal display, and so forth.

The unmanned vehicle travel system 70 is constituted by the unmanned vehicle 20, manned vehicles such as the loader 30 and the dozing machine 90, and the supervising device 40. Incidentally, the manned vehicles are not shown in FIG. 2.

In the work location 1, the supervising device 40 is provided to control and monitor a large number of unmanned vehicles 20.

The supervising device 40 is provided with a communication device 41, a processing device 42, an external input device 43, a memory device 44, a display device 45 and a editing device 46. The communication device 41 of the supervising device 40 is constituted by an antenna, a transmitter and a receiver and so forth for wireless communications. The processing device 42 is constituted by a numeric data processor such as CPU and memories such as ROM and RAM. In addition, the memory device 44 is constituted by memories such as ROM and RAM, recording medium such as USB memory capable of writing data thereinto and reading out data therefrom, and a memory device such as hard disks. Furthermore, the display device 45 is constituted by a display such as a liquid crystal monitor having an audio output function. The external input device 43 is a hardware interface through which topographical data (CAD data) can be communicated mutually with the CAD system 80. The communication device 41 of the supervising device 40 receives information on position of each of the unmanned vehicles 20 transmitted from the plural unmanned vehicles 20 by using wireless communication means such as a wireless LAN (Local Area Network). The received information on position is used to supervise and monitor the plural unmanned vehicles 20, and also to generated the travel route 10. As described later, the information on position is measured and obtained by a GPS sensor or the like.

On the other hand, the unmanned vehicle 20 is provided with a communication device 21, a processing device 22, a position measuring device 23, a control device 24 and a memory device 25. The communication device 21 is constituted by an antenna, a transmitter and a receiver and so forth for wireless communications. The processing device 22 is constituted by a numeric data processor such as CPU and memories such as ROM and RAM. In addition, the memory device 25 is constituted by memories such as ROM and RAM, and recording medium such as USB memory capable of writing data thereinto and reading data therefrom. Alternatively, the memory device 25 may also be a memory unit such as a hard desk with a high vibration resistance. The control device 24 is a controller for controlling the engine output, front-wheel steering angle, braking amount control for a brake. etc. of the unmanned vehicle 20, and is constituted by a numeric data processor such as CPU and memories such as ROM and RAM. The position measuring device 23 of the unmanned vehicle 20 measures the position of the vehicle of its own. As means for position measurement, a tire revolution number sensor and a gyroscope provided at the unmanned vehicle 20, for example, are used. The position of the vehicle is measured based on the output signal of the tire revolution number sensor and the output signal of the gyroscope. Alternatively, the position of the vehicle may be measured by receiving signals transmitted from a GPS satellite through a GPS antenna, and then detecting the signals with a GPS sensor. In addition, the unmanned vehicle 20 is provided with an inclination detecting device 27 as an gradient detector. Furthermore, in order to detect obstacles in front, there is provided an obstacle detecting device 26 such as a millimeter wave radar and a light radar sensor. When the obstacle detecting device 26 detects an obstacle (for example, a rock or another unmanned vehicle, etc.), it transmits a signal to the processing device 22, which in turn transmits to the control device 24 a command signal for making the unmanned vehicle 20 decelerate or stop. Furthermore, as described later, there is provided a distance measuring sensor 29, which makes it possible to measure the distance from the side wall, road shoulder and bank of the travel route 10. In addition, the unmanned vehicle 20 is provided with a steering sensor, not shown in the accompanying drawings, for detecting a front-wheel steering angle which is used for a steering angle control. As the steering sensor, a rotation angle sensor such as, for example, a rotary encoder is employed.

The position measuring device 23 of the unmanned vehicle 20 measures the three-dimensional position of the vehicle of its own. As a means for measuring positions, a GPS sensor, for example is employed, as stated above.

The information on position measured at the unmanned vehicle 20 is processed at the processing device 22, and transmitted to the supervising device 40 by way of the communication device 21. And, from the supervising device 40, the information on position measured by the unmanned vehicle 20 is transmitted to other unmanned vehicles as well as manned vehicles such as the loader 30 and the dozing machine 90.

The communication device 41 of the supervising device 40 receives the information on position transmitted from the plural unmanned vehicles 20. The received information on position is used for supervising and monitoring the plural unmanned vehicles 20 as well as for correcting the travel control data and the topographical data, as described later.

The external input device 43 of the supervising device 40 is inputted with CAD data in the CAD system 80. Through operations of a keyboard or the like at the side of the CAD system 80 by an operator of the CAD system 80, or through predetermined operations of manual operation buttons, etc. at the supervising device 40 by an operator of the supervising device 40, a desired CAD data is inputted into the external input device 43 of the supervising device 40 from the memory device of the CAD system 80.

The inputted CAD data is stored in the memory device 44.

The editing device 46 is a device into which commands to process and edit the CAD data are inputted through operations of an operator. As the editing device 46, an information input device constituted by plural manual operation buttons such as, for example, a keyboard and a tablet, etc. is employed. Through such operations of the manual operation buttons by an operator of the supervising device 40, a command signal is inputted into the processing device 42. Alternatively, it may be configured that by providing the CAD system 80 with the function of the editing device 46, and with the use of the CAD system 80, the CAD data is processed and edited or the commands for these is inputted.

At the processing device 42, the CAD data is processed and edited in accordance with the command signal inputted from the editing device 46, thereby to create the topographical data of the work location 1 and to generate the information on the travel route 10.

On the display device 45, the configuration of the earth's surface of the work location 1 and the travel path 10, in the middle of being processed and edited, and after having been processed and edited, are displayed.

The process and edit of the CAD data may also be performed by using, for example, a touch-sensitive panel GUI (Graphical User Interface) device. Through touching operations on the screen of the touch-sensitive panel GUI device that comprises the editing device 46 and the display device 45 in an integrated manner, it is possible to process and edit the CAD data, and to display the configuration of the earth's surface of the work location 1 and the travel route 10 in the middle of being processed and edited, and after having been processed and edited.

Now, regarding the CAD data which is the topographical data of the work location 1, in the case of adding another loading site illustrated in FIG. 1B by way of example, the CAD data is constituted by data on the position of the road shoulder of each part of the haul road 15C (distances from the travel route 10B to the road shoulders), the gradient of each part of the haul road 15C, the position of the borderline of the loading site 12, the gradient of each part of the areas in the loading site 12, etc.

In addition, regarding the information on the travel route 10, in the case of adding another loading site illustrated in FIG. 1B by way of example, it is information on positions of plural points which constitute the line of the travel route 10 on the travel route 10B up to the loading point 12b in the loading site 12, and is the information up to the target position when the unmanned vehicle 20 travels while controlling the travel.

From the unmanned vehicle 20 being traveling, a travel route request command is transmitted one after another to the supervising device 40 via the communication device 21.

When a travel route request command is received at the communication device 41 of the supervising device 40, the supervising device 40 transmits the information on the travel route 10 and the travel control data or the temporal travel control data to the unmanned vehicle 20 via the communication device 41. This travel control data (or temporal travel control data) means data that becomes necessary when the unmanned vehicle 20 is made to travel and stop and controls its steering, such as a maximum speed along the travel route 10.

At the communication device 21 of the unmanned vehicle 20, the information on the travel route 10 and the travel control data (or temporal travel control data) are received. At the memory device, the information on the travel route 10 and the travel control data (or temporal travel control data) are stored. The processing device 22 of the unmanned vehicle 20 creates control orders for making traveling and steering the unmanned vehicle 20 of its own based on the information on the travel route 10 and the travel control data (or temporal travel control data). These control orders are outputted to the control device 24. As a result, the control device 24 controls the travel, stop and steering of the unmanned vehicle 20 of its own, thereby to make the unmanned vehicle 20 travel, stop and be steered along the travel route 10.

First Embodiment

Explanation concerning the first embodiment will now be made below with reference to the flowchart illustrated in FIG. 3.

In the following descriptions, it is assumed that the work location 1 is currently in the situation as illustrated in FIG. 1A, and a new loading site 12 is to be added thereafter to generate a new ravel route 10B.

(Creating Topographical Data for the Work Location 1, and Generating Information for a New Travel Rote 10B)

First, an operator of the supervising device 40 operates the editing device 46 to create the topographical data of the work location 1, i.e., data on the position of the road shoulder of each part of the haul road 15C, the gradient of each part of the haul road 15C, the position of the borderline of the loading site 12, the gradient of each part of the areas in the loading site 12, etc., thereby to generate information on a new travel route 10B, i.e., information on each target position for the new travel route 10B up to a loading point 12b of the loading site 12 (step 101). Alternatively, in place of an operator of the supervising device 40, an operator of the CAD system 80 may operate the CAD system 80 to create the topographical data, i.e., data on the position of the road shoulder of each part of the haul road 15C, the gradient of each part of the haul road 15C, the position of the borderline of the loading site 12, the gradient of each part of the areas in the loading site 12, etc., and to transfer the created data to the supervising device 40 by way of the external input device 43. The operator of the supervising device 40 and the operator of the CAD system 80 may be the same operator, or may be different operators.

(Constructing the Work Location 1)

Next, the work location 1 including the new travel route 10B is constructed based on the created topographical data of the work location 1. For example, the topographical data of the work location 1 created at the supervising device 40 is transmitted to a constructor, and the constructor constructs (develops) the haul road 15C and the loading site 12 (step 102).

(Travelling Along the New Travel Route 10B in Accordance with Temporary Travel Control Data to Acquire Actual Topographical Data for the New Travel Route 10B)

At the processing device 42 of the supervising device 40, temporary travel control data is generated base on the topographical data for the work location 1. The temporary travel control data is created in consideration of safety. This is in consideration of a discrepancy between the topographical data for the work location 1 created on the basis of the CAD data and an actual configuration of the earth's surface of the actually constructed work location 1. For example, even in a case that it is judged that the magnitude of the falling gradient (hereafter, simply called "gradient") of the haul road 15C is G1 according to the topographical data, that is, a gradual down slope, and therefore, no problem would occur in effectiveness of braking if the unmanned vehicle 20 is made travel at the maximum speed V1 corresponding to the gradient G1 so that the brake would not be overloaded, if the gradient of the actual constructed haul road 15C is G2 (corresponding maximum speed is V2) which is steeper than the gradient G1 according to the topographical data, there might be a problem that effect of braking is insufficient or the brake might be overloaded excessively when the unmanned vehicle is made to travel at the maximum speed of V1. Hence, supposing that the gradient of the actual configuration of the earth's surface is G3, which is the greatest among assumable gradients, the maximum speed is set to be a temporary travel speed of V3, which is lower than the maximum speed V1 corresponding to the gradient G1 according to the topographical data, and at which speed braking can be performed safely and effectively. Incidentally, it is supposed that the magnitude of the gradient has a relation of G1<G2<G3, and the maximum speed has a relation of V1>V2>V3. In other words, the maximum speed V3 is prepared and set as one of the temporary travel control data.

When the temporary travel control data is generated, the supervising device 40 transmits information on the new travel route 10B and the temporary travel control data to the unmanned vehicle 20. Then, the unmanned vehicle 20 is made travel along the new travel route 10B in accordance with the temporary travel control data (for example, a temporary travel speed with the maximum speed being V3).

The unmanned vehicle 20 is mounted with the position measuring device 23 for measuring the position of the unmanned vehicle 20, and while the unmanned vehicle 20 travels along the new travel route 10B, the position measuring device 23 measures a three-dimensional position P for each point of the new travel route 10B one after another. By performing arithmetic processing based on the measured three-dimensional position P for each point of the new travel route 10B, the actual gradient G2 of the new travel route 10B, that is, the actual topographical data of the new travel route 10B is acquired. In addition, the actual topographical data can also be acquired from the actual gradient G2 of the new travel route 10B obtained by the inclination detecting device 27 (step 103).

(Correcting Temporary Travel Control Data)

The actual topographical data of the new travel route 10B acquired at the unmanned vehicle 20 is transmitted to the supervising device 40 through wireless communications. The processing device 42 of the supervising device 40 perform correction based on the actual topographical data of the new travel route 10B, that is, based on the actual gradient G2 so that the temporary travel control data, that is, the maximum speed V3 becomes the maximum speed V2 corresponding to the actual gradient G2 (step 104).

(Controlling Travel in Accordance with Corrected Travel Control Data)

The travel control data corrected by the supervising device 40, that is, the maximum speed V2 corresponding to the actual gradient G2 is transmitted together with the information on the new travel route 10B through wireless communications to an unmanned vehicle 20 that will travel next.

The unmanned vehicle 20, having received the corrected travel control data and the information on the new travel route 10B, travels along the new travel route 10B in accordance with the corrected travel control data, that is, the maximum speed V2 corresponding to the actual gradient G2 (step 105).

As described above, according to the first embodiment, the information on a new travel route 10B is generated based on the CAD data before the new travel route 10B has been constructed. By providing the information on the new travel route 10B to an unmanned vehicle 20 immediately after the new travel route 10B has been constructed, the unmanned vehicle can travel along the new travel route 10B immediately. Since the new travel control data and the travel route 10B are created by using the CAD data, the processes up to the travel (operation) of the unmanned vehicle 20 can be reduced than before, and since the travel control data is generated ultimately from the temporary travel control data in consideration of the reliability of the CAD data, the unmanned vehicle 20 can be made to travel (operate) under the travel control data with higher productivity (at the maximum speed suitable for the gradient of the travel route 10B).

Second Embodiment

For the above-described first embodiment, a variety of modifications can be performed.

In the first embodiment, after the work location 1 has been constructed, the unmanned vehicle 20 is designated for "vehicle" that travels in accordance with the temporary travel control data. However, such "vehicle" may be a manned vehicle. In addition, as "vehicle" that travels in accordance with the temporary travel control data, a transporter vehicle 20 for carrying freight is made to travel. However, such "vehicle" may not be a transporter vehicle 20. For example, a manned vehicle dedicated to performing measurements may be made to travel in accordance with the temporary travel control data.

In a case where, in particular, a unmanned vehicle 20 that carries a freight is made to travel, operations to measure the actual topographical data for the new travel route 10B can be performed simultaneously with carrying operations, which results in a further increase in the efficiency of the operations for the unmanned vehicle and further improvement in the productivity of the work location, compared with a case where a vehicle that is dedicated to performing measurements and performs no carrying task is made to travel.

Since the topographical data (gradient G1) for the work location 1 which is created based on the CAD data before the construction of the work location 1 does not reflect the actual configuration of earth's surface (gradient G2) after the construction of the work location 1, its reliability is low. For this reason, in the first embodiment, the maximum speed is set to be a speed of V3, which is lower than the maximum speed V1 corresponding to the topographical data (gradient G1), and at which braking can be performed safely without causing excessive overloading on the brake. However, this is merely described by way of example. If the reliability of topographical data is high, the temporary travel speed (maximum speed) may be set to be a speed higher than the speed V3, and if the reliability of topographical data is low, the temporary travel speed (maximum speed) may be set to be a speed even more small than the speed V3.

In addition, in the first embodiment, the temporary travel control data is corrected by making one unmanned vehicle 20 travel based on the temporary travel control data. However, it is also possible to perform the correction of the temporary travel control data by making plural unmanned vehicles 20 travel based on the temporary travel control data.

In that case, the maximum speed, which is the temporary travel speed, can be relaxed in accordance with the reliability of the gradient data, which is the actual topographical data to be acquired. For example, assuming that the variation among the gradient data becomes smaller and the variation among the vehicles becomes smaller as the gradient data is acquired and accumulated when plural unmanned vehicles 20 are made to travel successively one after another, it would be possible to gradually change the speed limit by the temporary travel speed (maximum speed) to be getting closer to the maximum speed V2 at a higher speed from the maximum speed V3 at a lower speed.

In addition, in the first embodiment, the temporary travel control data is corrected based on the acquired actual topographical data for the new travel route 10B. Alternatively, the topographical data for the work location 1 may be corrected based on the acquired actual topographical data for the new travel route 10B. Specifically, if the acquired actual gradient of the new travel route 10B is G2, the value of the gradient for the haul road 15C, which is a parameter of the topographical data of the work location 1, can be corrected from G1 to G2. The value of the gradient can be corrected by means of the tablet or keyboard of the CAD system 80, or the keyboard of the editing device 46 of the supervising device 40, etc.

Third Embodiment

In the process of step 101 in the first embodiment (FIG. 3), a simulation may be performed in which an unmanned vehicle 10 is made to travel along a new travel route 10B.

Explanation concerning the third embodiment will now be made below with reference to the flowchart illustrated in FIG. 4.

In steps 201-203, in the same manner as in step 101 (FIG. 3) of the first embodiment, the processes of creating the topographical data for the work location 1 and creating the information for the new travel route 10B are performed.

Specifically, first, CAD data is inputted into the supervising device 40 from the CAD system 80 by way of the external input device 43 to create the topographical data for the work location 1, that is, data on the position of the road shoulder of each part of the haul road 15C, the gradient of each part of the haul road 15C, the position of the borderline of the loading site 12, the gradient G1' of each part of the areas in the loading site 12, etc., and to generate information on a target position for the travel route 10B leading to a loading site 12 (step 201).

Next, simulation for making the unmanned vehicle 1 travel on the topographical data for the work location 1 is performed to verify whether or not the topographical data (gradient G1') is adequate. Incidentally, the maximum speed at which the unmanned vehicle is made to travel on the simulation is set to be a maximum speed V1', and is not provided with a speed limit such as a temporary travel speed V3 (<V1') (step 202). The simulation may be implemented either by running a simulation program stored in the memory device 44 of the supervising device 40 by means of the processing device 42, or by running the simulation program by means of a workstation or personal computer, not shown in the accompanying drawings.

By performing the simulation repeatedly, adequate topographical data for the work location 1 (gradient G1) and information on the new travel route 10B are finally determined. In addition, the travel control data corresponding to the topographical data (the maximum speed V1 in accordance with gradient G1) is also finally determined (step 203). This travel control data (the maximum speed V1 in accordance with gradient G1) is a travel control data determined on the simulation, which is different from temporary travel control data (maximum speed V3) described later. During the simulation, by giving a travel control data for the unmanned vehicle 20 on the simulation, a travel simulation from the loading site to the earth unloading site is performed, whereby the productivity of the unmanned vehicle 20 can be evaluated. In other words, with the simulation, the adequacy of the topographical data can be evaluated. By simulating the traveling time between the loading site and the earth unloading site, whether the topographical data is in an adequate form can be evaluated. For example, if there is a useless serpentine path, this would cause a deterioration of productivity, and the topographical data cannot be considered as being in an adequate form.

In the next step 204, in the same manner as in step 102 (FIG. 3) of the first embodiment, the work location 1 including a new travel route 10B is constructed based on the created topographical data for the work location 1 (step 204).

In the next steps 205 and 206, in the same manner as in step 103 (FIG. 3) of the first embodiment, processes of making the unmanned vehicle 20 travel in accordance with the temporary travel control data and acquiring actual topographical data for a new travel route 10B are performed.

Specifically, assuming that the gradient of the actual configuration of the earth's surface is a large gradient G3, the maximum speed is set to be a temporary travel speed V3, which is lower than the maximum speed V1 corresponding to the gradient G1 on the topographical data, at which braking can be performed safely, and the unmanned vehicle is made to travel accordingly (step 205).

The unmanned vehicle 20, while traveling along the new travel route 10B, measures, at the position measuring device 23a, three-dimensional position P for each point of the new travel route 10B, and acquires an actual gradient G2 of the new travel route 10B (actual topographical data for the new travel route 10B) based on the measured three-dimensional position P for each point of the new travel route 10B (step 206). Alternatively, the actual topographical data may also be acquired from the actual gradient G2 of the new travel route 10B acquired by the inclination detecting device 27.

In the next steps 207 through 211, in the same manner as in step 104 (FIG. 3) of the first embodiment, correction is performed for the temporary travel control data.

Specifically, the difference between the acquired actual topographical data (gradient G2) for the new travel route 10B and the topographical data (gradient G1) obtained from the CAD data is compared, and it is determined whether or not the acquired actual topographical data (gradient G2) for the new travel route 10B will be able to ensure the productivity and safety on the occasion when the unmanned vehicle 20 is made to travel.

For example, if it is determined that the acquired gradient data for the new travel route 10B is G2, which does not differ greatly compared with the gradient data G1 that is obtained from the CAD data, a small load would be applied to the brake of the unmanned vehicle 20 even if the unmanned vehicle 20 is made to travel at the gradient G2, and there would arise no problem in terms of productivity even if the unmanned vehicle 20 is made to travel at the travel speed V2 which corresponds to the gradient G2 (NO in step 207), then the procedure proceeds to the subsequent step 208.

However, if it is determined that the acquired gradient data is G4, which is large (for example, G4>G3), and which is different greatly compared with the gradient data G1 that is obtained from the CAD data, a large load would be applied to the brake of the unmanned vehicle 20, and there would arise problems in terms of productivity if the unmanned vehicle 20 is made to travel at the travel speed V4 (for example, V4<V3) which corresponds to the gradient G4 (YES in step 207), then the procedure proceeds to step 209 in which processes of steps 201-203 are performed again to create again the topographical data for the work location 1 and to generate again information on the new travel route and travel control data (step 209). Determination that there is a great difference between the actual gradient data G2 and the gradient data G1 obtained from the CAD data will be made in the following manner. Criterion value for determining that the difference is great is set in advance to be, for example, ±5 degrees, and this criterion value is stored in the memory device 44. When, for example, the actual gradient data G2 is 20 degrees and the gradient data G1 from the CAD data is 10 degrees (or 30 degrees), the difference between them is 10 degrees. Then, it is determined that the difference is great since the difference is 10 degrees, which is greater than the criterion value. In this case, the procedure proceeds from step 7 to step 209. On the other hand, if the actual gradient data G2 is 20 degrees and the gradient data G1 from the CAD data is 18 degrees (or 22 degrees), then it is determined that the difference is small since the difference is smaller than the criterion value. In this case, the procedure proceeds from step 7 to step 208.

Next, the process in step 204 is performed again, and the work location 1 including the new travel route 10B is constructed again (corrected) based on the re-created topographical data of the work location 1 (step 210), and the procedure proceeds to step 211.

At step 208, the temporary travel control data is corrected based on the acquired actual topographical data for the new travel route 10B. In this case, it is also possible to perform the correction of the temporary travel control data by making plural unmanned vehicles 20 travel based on the temporary travel control data.

For example, plural unmanned vehicles 20 are made to travel sequentially one after another, thereby to acquire actual topographical data for the new travel route 10B the required number of times in order for the reliability to be sufficiently high.

If the actual topographical data for the new travel route 10B has not been acquired the required number of times ("not reached required number of times" in the judgment in step 211), then the procedure proceeds again to step 205, and the same processes are repeated until the required number of times has been reached. Having reached the required number of times ("reached required number of times" in the judgment in step 211), then, assuming that the actual topographical data for the new travel route 10B has a sufficient reliability, it is determined that the actual topographical data (gradient G2) of the work location and the travel control data (the maximum speed V2) obtained by performing the averaging process, etc. on the accumulated data are the final corrected data (step 211).

In the next step 121, in the same manner as in step 105 (FIG. 3) of the first embodiment, the unmanned vehicle 20 is made to travel (operate) along the new travel route 10B in accordance with the corrected travel control data, that is, in accordance with the maximum speed V2 corresponding to the actual gradient G2 (step 212).

Fourth Embodiment

In each of the above-described embodiments, the case in which a loading site 12 is newly added is described as an example. However, that case is described merely by way of example, and the present invention may be applied to the case where any part of the work location 1 is constructed.

For example, referring to FIG. 5A, as the work in the work location 1 progresses, the haul road 15A shown in FIG. 1A comes to extend and becomes a longer haul road 15A'. When the loading site 11 shown in FIG. 1A is renewed into a loading site 11' located at a further distant position, it is necessary to rebuild the travel route 10A shown in FIG. 1A into a travel route 10A' in accordance with the haul road 15A' and the loading site 11'. According to the present invention, in the same manner as in the above-described embodiments, it is possible to create the topographical data for the work location including the haul road 15A' and the loading site 11' based on the CAD data, to generate a new travel route 10A' accordingly, and to make the unmanned vehicle 20 travel along the new travel route 10A'.

In addition, referring to FIG. 5B, the present invention can also be applied to an occasion when a crossroad 16' is newly created. At the crossroad 16', it is desirable in terms of productivity and safety that plural unmanned vehicles 20 traveling along plural travel routes 10C, 10D and so forth can go by each other safely, yet without reducing their speed greatly. According to the present invention, based on the CAD data, it is possible to quickly search travel routes 10C, 10D and so forth along which plural unmanned vehicle 20 can go by each other safely, yet without reducing their speed greatly.

In addition, referring to FIG. 6A, in the configuration of the earth's surface where a part 19' (road shoulder position) of the bank 19 of the straight haul road 15D is greatly curved locally, a conventional technique might have created a travel route 10E' which is curved along the form of a bank 19' as shown in a dashed line, thereby making the speed of the unmanned vehicle decrease and consequently making the productivity low. According to the present invention, on the other hand, since it is possible to quickly search a straight travel route 10E extending along the haul road 10D based on the CAD data, the unmanned vehicles 20 can be made to travel without lowering the productivity.

Fifth Embodiment

In the first to third embodiments, by way of example, taking gradient G as a parameter of the topographical data, the case is described in which the travel control data (the maximum speed V3) is corrected in accordance with the actual gradient data (G2). However, this case is illustrative only, and the correction of the travel control data can be implemented in accordance with any of the parameters in the topographical data.

For example, the correction of the travel control data can be implemented in accordance with a road shoulder position, which is one of the parameters in the topographical data.

FIG. 6B illustrates a transverse section of the haul road 15E. At the road shoulder position of the haul road 15E, a bank 19 is constructed, and it is supposed that the unmanned vehicle 20 travels along a new travel route 10F.

In this case, for the purpose of detecting the bank 19 (road shoulder position), an unmanned vehicle 20 is mounted with a distance measuring sensor 29, such as a laser sensor and millimeter-wave laser, for measuring the distance to an obstacle that exists around (on the sides of, in front of and at the back of) this own vehicle 20. With the distance measuring sensor 29, a distance S from the own vehicle 20 to the bank 19 is measured.

Conceivable examples for this embodiment are as follows.

a) When the haul road 15E has been constructed, an unmanned vehicle 20 is made to travel along the new travel route 10F based on the temporary travel control data, namely, at a temporary speed. Then, the distance S from the travel route 10F to the bank 19 (road shoulder position) is measured by the distance measuring device 29 mounted on the unmanned vehicle 20, thereby to correct the temporary speed into an appropriate speed so that the vehicle speed can be a safety speed corresponding to the distance S. The relationship between the distance S and the speed at which the unmanned vehicle 20 can travel safely has been stored in the memory device 44 or the memory device 25 in the form of a mapping data representing the relationship between the distance S and the speed. Therefore, depending on the distance S measured, the temporary speed is corrected into an appropriate speed at the processing device 42 or the processing device 22. Specifically, settings are made so that the unmanned vehicle 20 travels at a high speed if the distance S is large, and at a low speed if the distance S is small.

b) The distance S from the travel route 10F to the bank 19 (road shoulder position) is measured in the same manner by the distance measuring device 29 mounted on the unmanned vehicle 20. However, if the distance S is so small that the safety cannot be ensured, then, in the same manner as in steps 209 and 210 of the third embodiment (FIG. 4), the topographical data (road shoulder position) for the work location 1 is created again based on the CAD data, and information on the new travel route and travel control data are generated again.

c) If the bank 19 is detected in front of the unmanned vehicle 20 by the distance measuring device 29, having judged that safety cannot be ensured due to the obstacle exiting on the travel route 10F, the unmanned vehicle 20 is decelerated and stopped, and transmits the topographical data having acquired up to that point to the supervising device 40. Then, in the same manner as in steps 209 and 210 (FIG. 4) in the third embodiment, the topographical data (road shoulder position) for the work location 1 is created again, and information on the new travel route 10F and travel control data are generated again, based on the CAD data.

BRIEF DESCRIPTION OF THE DRAWINGS

FIGS. 1A and 1B are top plan views of a work location in which FIG. 1A illustrates a work location into which another loading site is yet to be added and FIG. 1B illustrates a work location into which another loading site has been added;

Figure 1A:
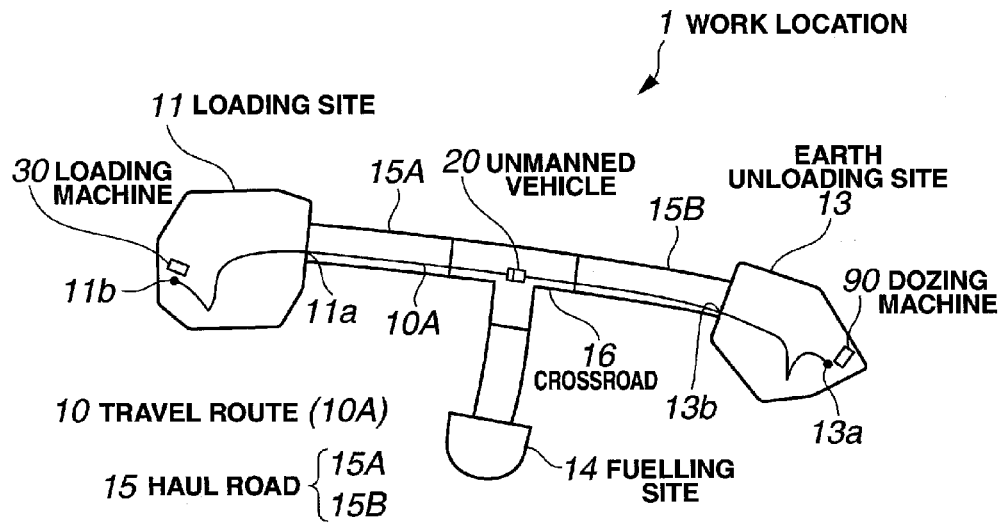
Figure 1B:
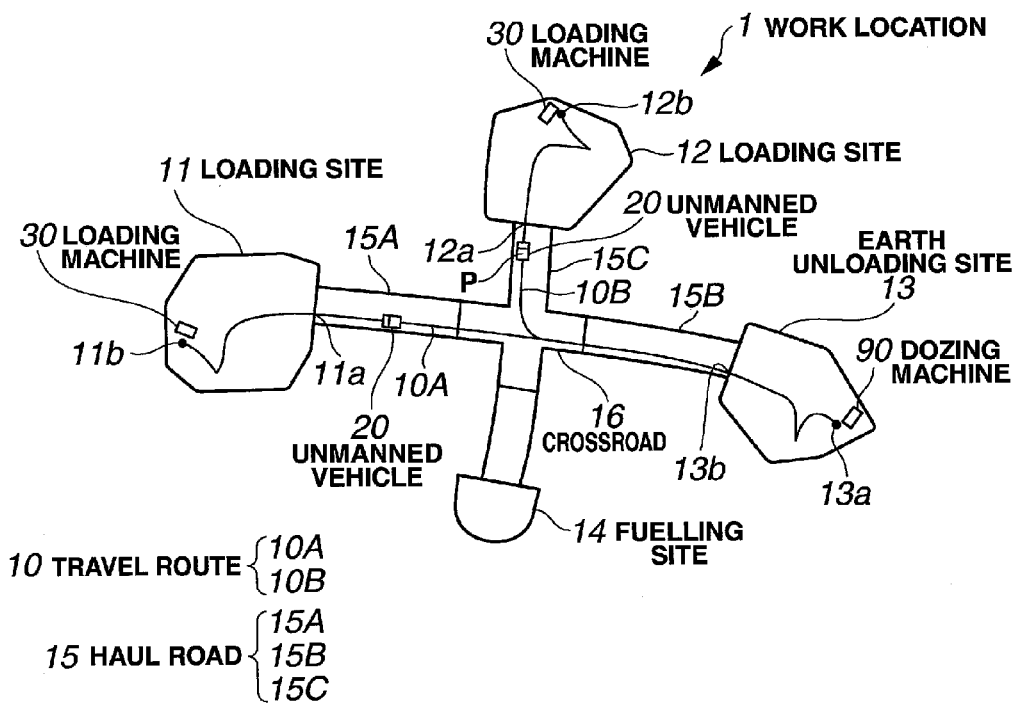
Figure 2:
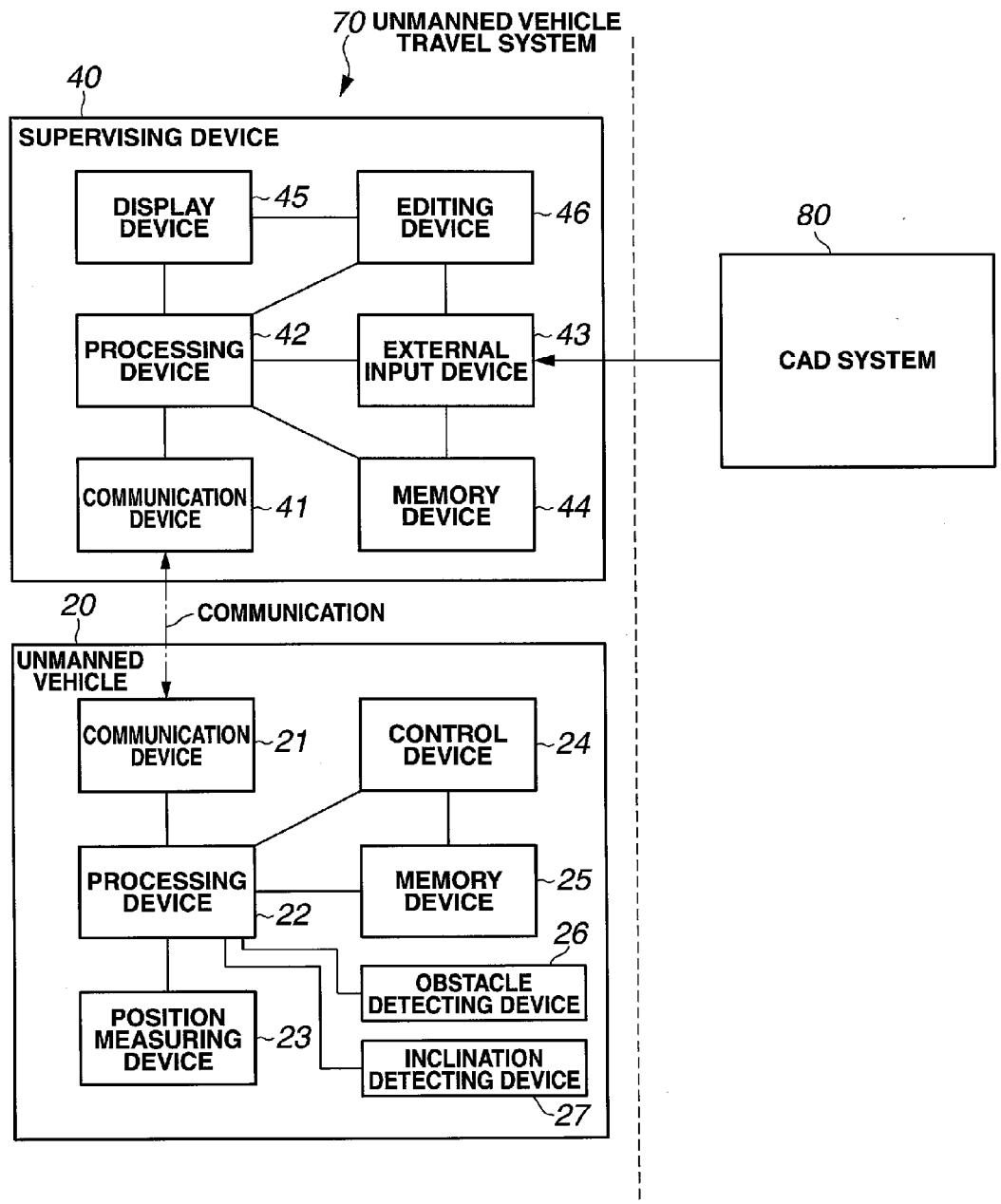
FIG. 2 is a block diagram illustrating a configuration according to an exemplary embodiment of a travel system for unmanned vehicle and a CAD system provided outside of the travel system for unmanned vehicle.
Figure 3:
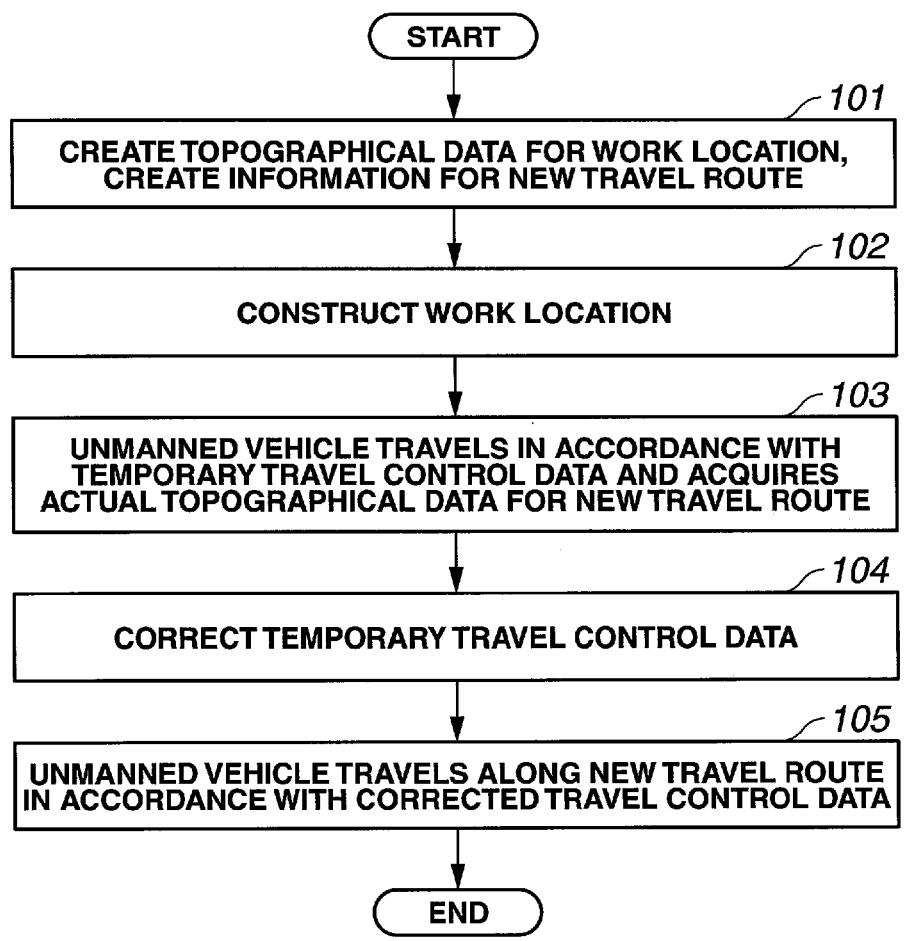
FIG. 3 is a flowchart illustrating the procedure to be followed in the first embodiment.
Figure 4:
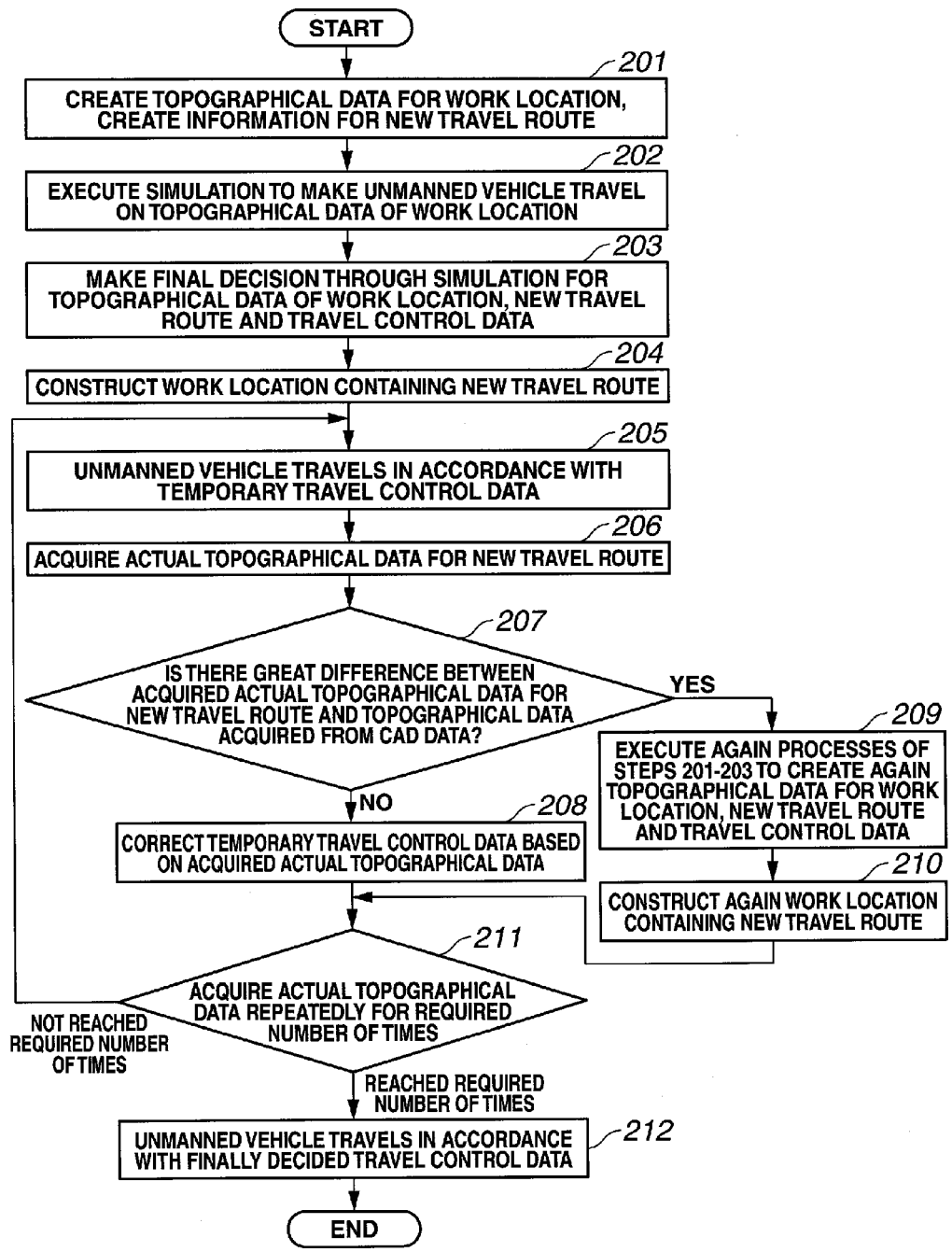
FIG. 4 is a flowchart illustrating the procedure to be followed in the third embodiment.
Figure 5A:
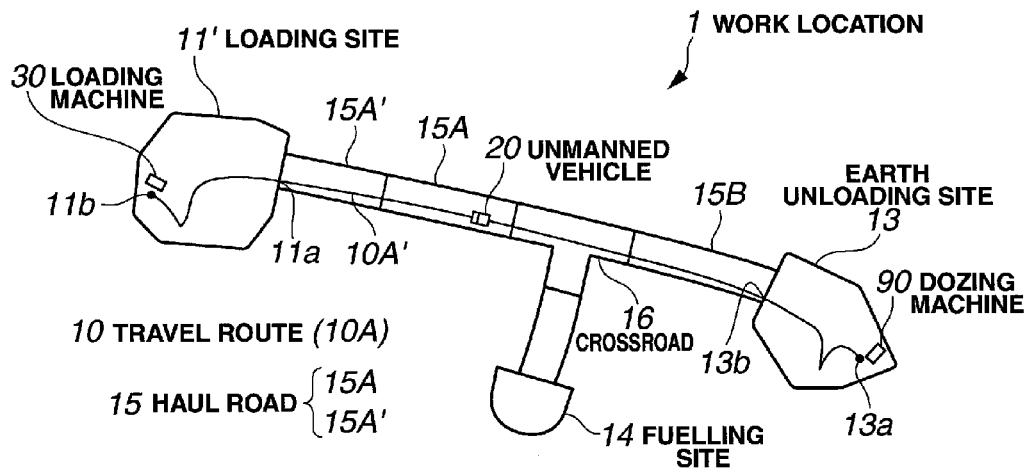
FIGS. 5A and 5B are drawings for explaining another embodiments.
Figure 5B:
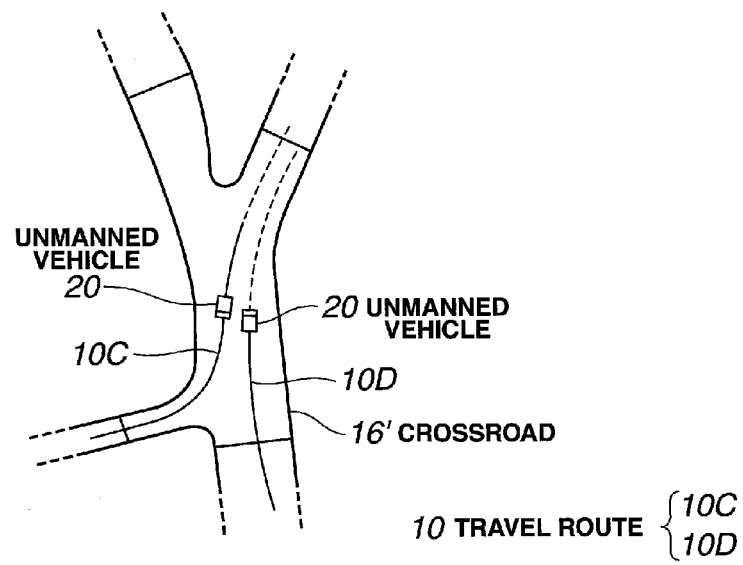
Figure 6A:
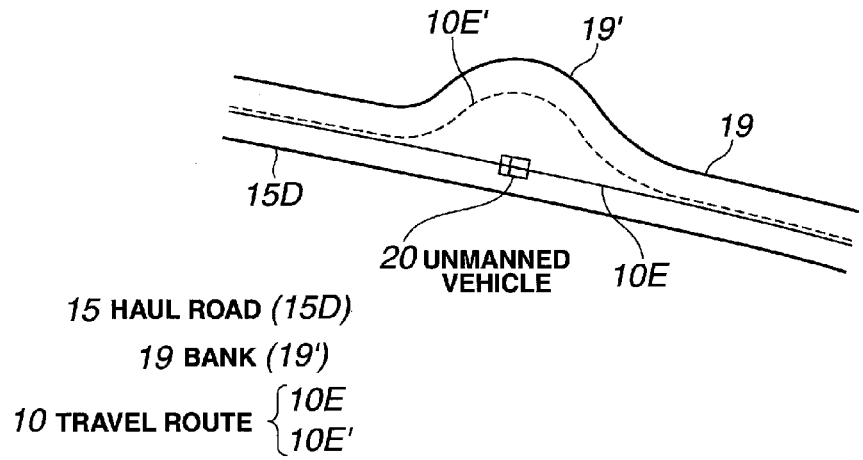
FIGS. 6A and 6B are drawings for explaining another embodiments.
Figure 6B:
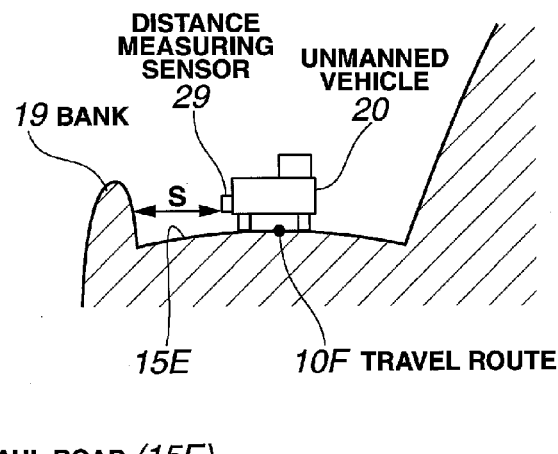

The invention claimed is:

1. In a travel system for an unmanned vehicle that makes the unmanned vehicle travel along a travel route within a work location, a method of controlling travel within the travel system for an unmanned vehicle, comprising the steps of:
    creating topographical data for the work location;
    generating information on a new travel route and temporary travel control data based on the created topographical data for the work location;
    constructing a work location including the new travel route based on the created topographical data;
    acquiring actual topographical data for the new travel route by providing the generated information on the new travel route to a vehicle and making the vehicle travel along the new travel route in accordance with the temporary travel control data;
    correcting the temporary travel control data based on the acquired actual topographical data for the new travel route; and
    making the unmanned vehicle travel in accordance with the corrected travel control data.

2. The method of controlling travel within a travel system for an unmanned vehicle according to claim 1, further comprising the step of:
    correcting the topographical data for the work location based on the acquired actual topographical data for the new travel route.

3. The method of controlling travel within a travel system for an unmanned vehicle according to claim 1, wherein
    topographical data created before construction of the work location includes gradient data, and the temporary travel control data includes a temporary travel speed for the vehicle; and
    speed limit by the temporary travel speed is relaxed in accordance with an increase in reliability of the gradient data among the topographical data created before the construction of the work location.

4. The method of controlling travel within a travel system for an unmanned vehicle according to claim 1, wherein
    topographical data created before the construction of the work location includes gradient data, and the temporary travel control data includes a temporary travel speed for the vehicle; and
    speed limit by the temporary travel speed is relaxed in accordance with an increase in reliability of actual gradient data for the new travel route acquired after the construction of the work location.

5. The method of controlling travel within a travel system for an unmanned vehicle according to claim 1, wherein
    topographical data created before the construction of the work location includes gradient data, and the temporary travel control data includes a temporary travel speed for the vehicle;
    reliability of the gradient data for the work location is judged by performing acquisition of the actual topographical data a plurality of times; and
    speed limit by the temporary travel speed is relaxed in accordance with an increase in reliability of the gradient data for the work location.

6. The method of controlling travel within a travel system for an unmanned vehicle according to claim 1, wherein
    both the vehicle for acquiring the actual topographical data for the new travel route and the unmanned vehicle that travels in accordance with the corrected travel control data are unmanned vehicles for carrying freight.

7. A travel system for an unmanned vehicle that makes the unmanned vehicle travel along a travel route within a work location, wherein
    the travel system
    creates topographical data for the work location;
    generates information on a new travel route and temporary travel control data based on the created topographical data for the work location;
    constructs the work location including the new travel route based on the created topographical data;
    acquires actual topographical data for the new travel route by providing a vehicle with the information on the new travel route generated and making the vehicle travel along the new travel route in accordance with the temporary travel control data;
    corrects the temporary travel control data based on the acquired actual topographical data for the new travel route; and
    makes the unmanned vehicle travel in accordance with the corrected travel control data.

8. The method of controlling travel within a travel system for an unmanned vehicle according to claim 2, wherein
    topographical data created before construction of the work location includes gradient data, and the temporary travel control data includes a temporary travel speed for the vehicle; and
    speed limit by the temporary travel speed is relaxed in accordance with an increase in reliability of the gradient data among the topographical data created before the construction of the work location.

9. The method of controlling travel within a travel system for an unmanned vehicle according to claim 2, wherein
  topographical data created before the construction of the work location includes gradient data, and the temporary travel control data includes a temporary travel speed for the vehicle; and
  speed limit by the temporary travel speed is relaxed in accordance with an increase in reliability of actual gradient data for the new travel route acquired after the construction of the work location.

10. The method of controlling travel within a travel system for an unmanned vehicle according to claim 2, wherein
  topographical data created before the construction of the work location includes gradient data, and the temporary travel control data includes a temporary travel speed for the vehicle;
  reliability of the gradient data for the work location is judged by performing acquisition of the actual topographical data a plurality of times; and
  speed limit by the temporary travel speed is relaxed in accordance with an increase in reliability of the gradient data for the work location.

11. The method of controlling travel within a travel system for an unmanned vehicle according to claim 1, wherein
  both the vehicle for acquiring the actual topographical data for the new travel route and the unmanned vehicle that travels in accordance with the corrected travel control data are unmanned vehicles for carrying freight.

12. The method of controlling travel within a travel system for an unmanned vehicle according to claim 3, wherein
  topographical data created before the construction of the work location includes gradient data, and the temporary travel control data includes a temporary travel speed for the vehicle; and
  speed limit by the temporary travel speed is relaxed in accordance with an increase in reliability of actual gradient data for the new travel route acquired after the construction of the work location.

13. The method of controlling travel within a travel system for an unmanned vehicle according to claim 3, wherein
  topographical data created before the construction of the work location includes gradient data, and the temporary travel control data includes a temporary travel speed for the vehicle;
  reliability of the gradient data for the work location is judged by performing acquisition of the actual topographical data a plurality of times; and
  speed limit by the temporary travel speed is relaxed in accordance with an increase in reliability of the gradient data for the work location.

14. The method of controlling travel within a travel system for an unmanned vehicle according to claim 3, wherein
  both the vehicle for acquiring the actual topographical data for the new travel route and the unmanned vehicle that travels in accordance with the corrected travel control data are unmanned vehicles for carrying freight.

15. The method of controlling travel within a travel system for an unmanned vehicle according to claim 4, wherein
  topographical data created before the construction of the work location includes gradient data, and the temporary travel control data includes a temporary travel speed for the vehicle;
  reliability of the gradient data for the work location is judged by performing acquisition of the actual topographical data a plurality of times; and
  speed limit by the temporary travel speed is relaxed in accordance with an increase in reliability of the gradient data for the work location.

16. The method of controlling travel within a travel system for an unmanned vehicle according to claim 4, wherein
  both the vehicle for acquiring the actual topographical data for the new travel route and the unmanned vehicle that travels in accordance with the corrected travel control data are unmanned vehicles for carrying freight.

17. The method of controlling travel within a travel system for an unmanned vehicle according to claim 5, wherein
  both the vehicle for acquiring the actual topographical data for the new travel route and the unmanned vehicle that travels in accordance with the corrected travel control data are unmanned vehicles for carrying freight.

18. The method of controlling travel within a travel system for an unmanned vehicle according to claim 8, wherein
  topographical data created before the construction of the work location includes gradient data, and the temporary travel control data includes a temporary travel speed for the vehicle; and
  speed limit by the temporary travel speed is relaxed in accordance with an increase in reliability of actual gradient data for the new travel route acquired after the construction of the work location.

19. The method of controlling travel within a travel system for an unmanned vehicle according to claim 8, wherein
  topographical data created before the construction of the work location includes gradient data, and the temporary travel control data includes a temporary travel speed for the vehicle;
  reliability of the gradient data for the work location is judged by performing acquisition of the actual topographical data a plurality of times; and
  speed limit by the temporary travel speed is relaxed in accordance with an increase in reliability of the gradient data for the work location.

20. The method of controlling travel within a travel system for an unmanned vehicle according to claim 8, wherein
  both the vehicle for acquiring the actual topographical data for the new travel route and the unmanned vehicle that travels in accordance with the corrected travel control data are unmanned vehicles for carrying freight.

* * * * *